US011754339B2

(12) United States Patent
Verma et al.

(10) Patent No.: US 11,754,339 B2
(45) Date of Patent: Sep. 12, 2023

(54) COGNITIVE DRYNESS DETERMINATION OF GARMENTS

(71) Applicant: Kyndryl, Inc., New York, NY (US)

(72) Inventors: Pramod Verma, Fairfax, VA (US); Rachel Leekin, White Plains, NY (US); Seema Nagar, Bangalore (IN); Kuntal Dey, New Delhi (IN)

(73) Assignee: Kyndryl, Inc., New York, NY (US)

( * ) Notice: Subject to any disclaimer, the term of this patent is extended or adjusted under 35 U.S.C. 154(b) by 1136 days.

(21) Appl. No.: 16/429,320

(22) Filed: Jun. 3, 2019

(65) Prior Publication Data

US 2020/0378684 A1   Dec. 3, 2020

(51) Int. Cl.
*F26B 25/22* (2006.01)
*A41D 1/00* (2018.01)
*G01N 27/12* (2006.01)
*D06F 57/06* (2006.01)
*D06F 103/04* (2020.01)

(52) U.S. Cl.
CPC .............. *F26B 25/22* (2013.01); *A41D 1/002* (2013.01); *D06F 57/06* (2013.01); *G01N 27/121* (2013.01); *D06F 2103/04* (2020.02)

(58) Field of Classification Search
CPC ......... F26B 25/22; A41D 1/002; D06F 57/06; D06F 2103/04; D06F 34/05; D06F 2103/02; D06F 2103/08; D06F 58/38; D06F 34/26; D06F 58/00; D06F 2105/58; D06F 34/18; G01N 27/121
USPC ............................................................ 73/73
See application file for complete search history.

(56) References Cited

U.S. PATENT DOCUMENTS

| | | | |
|---|---|---|---|
| 9,582,038 | B1 | 2/2017 | Jayaraman et al. |
| 2013/0211208 | A1 | 8/2013 | Varadan et al. |
| 2017/0215493 | A1 | 8/2017 | Maxey et al. |

(Continued)

FOREIGN PATENT DOCUMENTS

| | | |
|---|---|---|
| CN | 202359407 U | 8/2012 |
| CN | 103898719 A | 7/2014 |
| CN | 206788658 U | 12/2017 |

(Continued)

OTHER PUBLICATIONS

IBM, "Explore the Internet of Things (IoT)," https://www.ibm.com/internet-of-things, printed May 28, 2019, 4 pgs.

(Continued)

*Primary Examiner* — Marrit Eyassu
(74) *Attorney, Agent, or Firm* — Erik Swanson; George S. Blasiak; Heslin Rothenberg Farley & Mesiti P.C.

(57) ABSTRACT

Provided is a method, computer program product, and drying system for determining a dryness level of a garment. A processor of a controller may receive location data from a position sensor. The location data indicates a position of one or more garments on a drying rack. The processor may register the location of the one or more garments on a virtual map of the drying rack displayed on a user interface of the controller. The processor may receive dryness data for the one or more garments from a moisture sensor. The processor may compare the dryness data to a dryness threshold. In response to the dryness data meeting the dryness threshold, the processor may push a notification to a user.

20 Claims, 8 Drawing Sheets

(56) References Cited

U.S. PATENT DOCUMENTS

2019/0203407 A1\* 7/2019 Guan .................... F26B 25/003

FOREIGN PATENT DOCUMENTS

| CN | 206946234 | U |   | 1/2018  |            |
|----|-----------|---|---|---------|------------|
| CN | 107733758 | A | * | 2/2018  | G01D 21/02 |
| CN | 108287480 | A | * | 7/2018  |            |
| CN | 108315988 | A | * | 7/2018  | D06F 58/30 |
| CN | 109468818 | A | * | 3/2019  |            |
| EP | 3250745   | A1|   | 12/2017 |            |
| JP | H06347428 | A | * | 12/1994 |            |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

COGNITIVE DRYNESS DETERMINATION OF GARMENTS

BACKGROUND

The present disclosure relates generally to the field of drying mechanisms, and more specifically, to a drying system for determining the dryness level of a garment.

When drying garments, many users typically place the garment within a clothes dryer or on a drying rack. For a drying rack, the user typically drapes the garment on the rack or places the garment on a hanger which is hung from the rack. Once on the drying rack, the garment may dry naturally through exposure to the air. In order to determine whether the garment is fully dry, a user must continually check the garment for dampness.

SUMMARY

Embodiments of the present disclosure include a method, computer program product, and drying system for determining a dryness level of a garment. A processor of a controller may receive location data from a position sensor. The location data indicates a position of one or more garments on a drying rack. The processor may register the location of the one or more garments on a virtual map of the drying rack displayed on a user interface of the controller. The processor may receive dryness data for the one or more garments from a moisture sensor. The processor may compare the dryness data to a dryness threshold. In response to the dryness data meeting the dryness threshold, the processor may push a notification to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
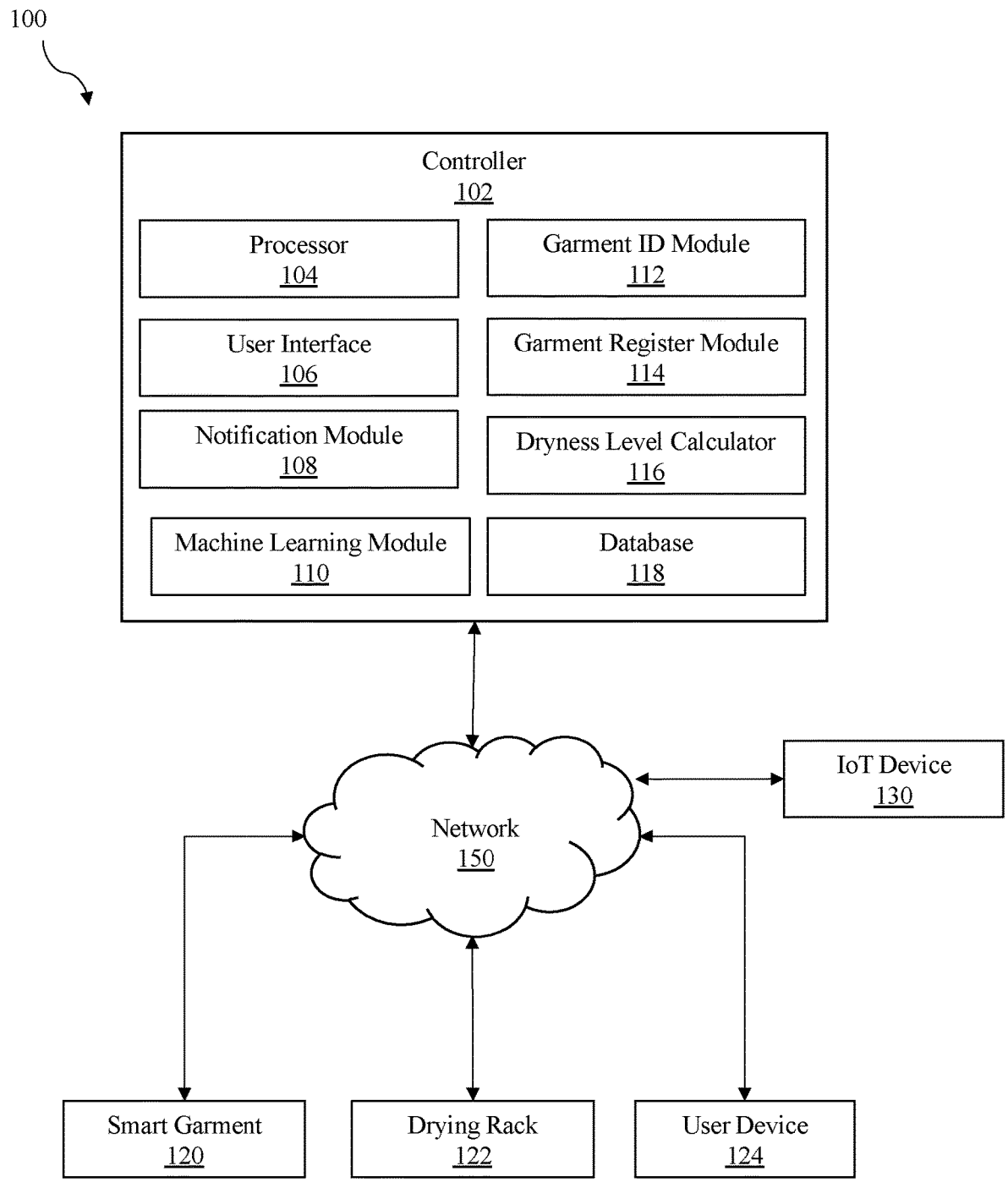
FIG. 1 illustrates a block diagram of a drying system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of drying mechanisms, and more particularly to a drying system for determining the dryness level of a garment. While the present disclosure is not necessarily limited to such applications, various aspects of the disclosure may be appreciated through a discussion of various examples using this context.

When drying garments, many users typically place the garment within a clothes dryer or on a drying rack. For a drying rack, the user typically drapes the garment on the rack or places the garment on a hanger which is hung from the rack. Once on the drying rack, the garment may dry naturally through exposure to the air. In order to determine whether the garment is fully dry, a user must continually check the garment for dampness. However, having to continually check the dryness level of each garment on the drying rack may be an inconvenience for a user.

Embodiments of the present disclosure utilize a drying system to determine the dryness level of a smart garment. In embodiments, the system includes a drying rack, a controller, and one or more smart garments. The system may receive location data from a position sensor disposed on the one or more smart garments. The location data indicates that the one or more smart garments has been placed at a specific location on the drying rack. For example, when a smart garment is brought within a proximity (e.g., 3 feet) of the controller and/or drying rack, the system recognizes the smart garments location on the rack via the sensor. Once the location of the garment in relation to the drying rack is determined, the system will register the location of the smart garment on a user interface (UI) of the controller. For example, the controller will mark the location of the smart garment on a virtual map of the drying rack on the UI.

In embodiments, the virtual map of the drying rack's physical configuration (e.g., number of hanging racks, size, position, etc.) is provided to the controller allowing the controller to identify the specific zones where garments may be placed. In some embodiments, the drying rack may include various sensors configured to identify where a garment is placed on the drying rack. For example, the drying rack may include sensors placed within each drying member (e.g., horizontal rod/rack, hanger, etc.) that sense the one or more smart garments have been placed on the respective drying member. In this way, the sensors within the drying rack may communicate with sensors disposed within the smart garment. In other embodiments, sensors disposed within the drying rack may detect regular garments (e.g., non-smart garments) when positioned on the drying rack.

In embodiments, the controller may receive dryness data from one or more moisture sensors disposed on the one or more smart garments. For example, each smart garment includes one or more moisture sensors that are configured to measure the moisture level of the respective garment. The data generated from the moisture sensor is then sent to the controller. Once received by the controller, the dryness data may be compared to a dryness threshold to determine if the smart garment has reached a predetermined dryness level. For example, a user may determine how dry (e.g., 5% moisture level) they want their garments to be in order to receive a notification. In other embodiments, the drying members of the rack may include moisture sensors that are configured to detect moisture levels within a regular garment. In this way, the system may be utilized to determine dryness levels for regular garments in addition to the smart garments.

In embodiments, the predetermined dryness level may be a scored value (e.g., 1-100% moisture range) determined by the user or set by default. Once the smart garment has reached the predetermined dryness level, the controller pushes a notification to a user indicating that the smart garment is dry. For example, a user may prefer their garments to reach at least a 10% moisture level to be considered dry. Once the system determines the garment has reached the 10% moisture level threshold, the controller will push a notification to the user (e.g., sent to user's smartphone) indicating that one or more garments have reached this level. In this way, the user does not have to continually check if their garments are dry, rather the system will notify them accordingly.

In embodiments, the smart garments may be grouped by one or more attributes, such that a notification is sent to the user when the group of smart garments has been determined to be dry. For example, a user may group a plurality of smart garments that are considered high priority garments. In this way, the system will determine when the specified group of garments are dry rather than on an individual level. This allows the user to pick and choose when to be notified regarding specific groups of garments. For example, the user may want to know when all of their cotton shirts are dry. These shirts would be grouped according to the fabric and type of garment and identified through their location on the drying rack. Once the grouped garments are determined to be dry, the user would be notified by the controller.

In embodiments, the system may notify the user with an estimated drying time for the one or more smart garments or for a group of smart garments. The system may utilize machine learning to determine predicted dryness levels based on historical data. This allows the system to predict when various types of garments would meet a certain dryness level.

In embodiments, the system may analyze garment tracking profile information corresponding to each smart garment that has been generated during previous drying sessions. In embodiments, the tracking profile information may include drying rate data that has been analyzed and/or generated for each smart garment. The system may analyze drying rates for smart garments placed in various locations on the drying rack to determine location zones that dry the respective garments the quickest. This information may be used to notify the user and suggest locations for placement on the drying rack for specific smart garments and/or groups of garments based on the profile information.

For example, thicker fabric garments may be determined to dry quickest when placed on the top portion of the drying rack. The system may determine from the garment profile for a respective smart garment that the garment is made of a thicker fabric. The system may notify the user to place the thicker garment on the top rack when drying in order to achieve the fastest drying rate.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a drying system 100, in accordance with embodiments of the present disclosure. In the illustrated embodiment, drying system 100 includes controller 102, smart garment 120, drying rack 122, user device 124, and IoT device 130 that are communicatively coupled via network 150. In embodiments, controller 102, user device 124, and IoT device 130 may be any type of computer system(s) and may be substantially similar to computer system 1101 of FIG. 7.

The network 150 may be any type of communication network, such as a wireless network or a cloud computing network. The network 150 may be substantially similar to, or the same as, cloud computing environment 50 described in FIG. 8 and FIG. 9. In some embodiments, the network 150 can be implemented using any number of any suitable communications media. For example, the network may be a wide area network (WAN), a local area network (LAN), a personal area network (PAN) used for exchanging data over short distances, an internet, or an intranet. In certain embodiments, the various systems may be local to each other, and communicate via any appropriate local communication medium.

For example, controller 102 may communicate with drying rack 122 and/or smart garment 120 using an ad hoc local network, one or more hardwire connections (e.g., an Ethernet cable) and/or wireless communication networks (e.g., wireless router, personal area network). In some embodiments, the various systems may be communicatively coupled using a combination of one or more networks and/or one or more local connections. For example, controller 102 may communicate with drying rack 122 using a hardwired connection, while communication between the controller 102 and smart garment 120 may be through a wireless communication network (e.g., PAN, ad hoc network, etc.). In embodiments, the network may be configured with joining permissions that cover the entire area of the drying rack 122 and a small threshold area/radius beyond the drying rack's physical structure. This will allow any smart entity (e.g., smart garment 120, IoT device 130, etc.) within the proximate area to join the drying system 100.

In the illustrated embodiment, controller 102 includes processor 104, user interface (UI) 106, notification module 108, garment identification (ID) module 112, garment register module 114, and dryness level calculator 116. UI 106 is configured to output a virtual map of drying rack 122. For example, UI 106 will display the drying rack's physical configuration (e.g., shape, size, dimension, position of controller 102 on the drying rack, number of rack members, etc.).

In embodiments, garment ID module 112 is configured to recognize one or more smart garments that attempt to join the network 150. The garment ID module 112 may recognize smart garment 120 by detecting one or more sensors disposed on the smart garment. In embodiments, the one or more sensors disposed on the smart garment may be position sensors that allow the garment ID module 112 to detect the location of the smart garment 120 relative to the drying rack 122. For example, the garment ID module 112 may determine that smart garment 120 has been placed on an upper right drying member of the drying rack 122 by receiving location data from the position sensor.

In embodiments, each smart garment 120 may include an identification (ID) value that allows the garment ID module 112 to identify and track various attributes (e.g., fabric, type of garment, thickness, size, etc.) of the smart garment. In embodiments, the controller 102 may generate a garment tracking profile using the ID value for each smart garment and store this information on database 118. In embodiments, the garment tracking profile may include historical data generated for each smart garment 120. For example, the garment tracking profile may include historical drying rate data generated from previous drying sessions that indicate how quickly the smart garment dries within specific zones of the drying rack 122.

In other embodiments, drying rack 122 may include position sensors that communicate with the sensors disposed on the smart garment 120 in order to determine the position of the smart garment when placed on the drying rack. In an embodiment, the drying members of the rack may include sensors configured to detect the location of regular garments (e.g., non-smart garments) positioned on the drying rack 122.

In embodiments, garment register module 114 will register smart garment 120 on the virtual map of drying rack 122 once the smart garment has been identified. The garment register module 114 uses the smart garment's ID and location information detected from the sensor of the smart garment to mark the location of the smart garment on the drying rack. Once the smart garment 120 is registered on the drying rack, the controller may begin to receive dryness data (e.g., % moisture, humidity, etc.) from one or more moisture sensors disposed on the smart garment 120.

In embodiments, the garment register module 114 will register the smart garment 120 on the UI 106 only if the smart garment 120 has been positioned on the drying rack 122 for a predetermined time. For example, a user may drape a plurality of smart garments 120 over the top of the drying rack 122 while they are organizing the position/location of each smart garment on the rack. Until the garments are organized, the garment register module 114 will not register the respective garments in their respective position on the rack until they have met a predetermined time threshold (e.g., 1 minute). In this way, the user has time to arrange the smart garments 120 before they are registered on the virtual map of the drying rack 122. In other embodiments, the user may manually register the smart garments 120 on the virtual map of the drying rack 122 using the UI 106.

In embodiments, dryness level calculator 116 is configured to determine the dryness level of each smart garment 120. The dryness level calculator 116 analyzes dryness data received from one or more moisture sensors disposed on smart garment 120. The moisture sensors may be any type of sensor configured to generate dryness data. For example, the local dryness of the smart garment 120 may be determined by passing a mild electrical current between two moisture sensors and measuring the resistance. Moist or humid clothes provide low resistance. These electrical values may be translated into a score (e.g., moisture level of 1-100%) by the dryness level calculator 116 and compared to a dryness threshold. If a predetermined threshold (e.g., 18% dryness) is met, the controller 102 may notify a user that the smart garment 120 is dry by sending a notification using notification module 108.

In embodiments, the notification module 108 may push and/or send any type of notification (e.g., text, image, email, alert, etc.) to the user. For example, the notification module 108 may send a text message to user device 124 indicating one or more smart garments 120 are dry. User device 124 may be any device configured to receive an electronic notification (e.g., smartphone, smartwatch, tablet, computer, etc.). In some embodiments, user device 124 may include a software application that displays an image of the virtual map of the drying rack, such that a user can visually see what smart garments are dry or near a preferred dryness level.

In embodiments, the notification module 108 may notify the user with estimated drying times for one or more smart garments. In embodiments, the notification module 108 may suggest to the user location zones (e.g., positional pockets) on the drying rack 122 having the fastest drying rate for specific smart garments 120. In this way, the user may place the one or more garments at a position on the drying rack that will result with the garments drying the quickest. The notification module 108 may utilize machine learning module 110 to determine drying rates for the smart garments.

In embodiments, machine learning module 110 may comprise various machine learning engines (artificial neural network, correlation engines, natural language processing engine, reinforcement feedback learning model, supervised learning model, etc.) configured to analyze data generated from various sources (e.g., smart garments, dryness level calculator, etc.) of the system 100.

For example, machine learning module 110 may analyze historical dryness data for each smart garment 120 to predict estimated drying times for the respective smart garment. For example, the machine learning module 110 may generate a drying rate chart (e.g., graph, histogram, etc.) that tracks drying rates for the smart garment 120 when placed at various positions on the drying rack 122. The drying rate charts may be used to determine the best location for drying the specific smart garment when placed on the drying rack.

For example, historical dryness data may indicate that blue jeans dry the quickest when placed on the lowest right drying member. The machine learning module 110 may use the historical data to predict drying rates for similar garments. In this way, the system may determine estimated drying rates for new smart garments having similar attributes to previously dried garments. The drying rates may be used by the machine learning module 110 to determine estimated drying times which can be sent to the user. In this way, the user can be notified when to expect their garments to be dry.

In embodiments, the machine learning module 110 may normalize estimated drying times based on the attributes of the smart garment taken from the garment tracking profile. For example, if a garment thickness is pre-specified (e.g., thick wool, thin cotton, etc.) or known from external knowledge sources, then that attribute is used to normalize drying rates by scaling up or down weighting values to determine estimated drying times. In embodiments, the machine learning module 110 will continually analyze new dryness data to update garment tracking profiles. As more data is learned by the machine learning module 110, weights applied to the garment tracking profile can be adjusted, automatically, by processor 104. Over time, the machine learning module 110 can become more accurate in predicting estimated drying times and determining positional zones on the drying rack that produce the fastest drying rates for respective smart garments.

In embodiments, the controller 102 may connect to various types of IoT devices 130 within an environment (e.g., home, laundry room, basement, patio, balcony, etc.). In this way, the controller 102 may receive additional data regarding the environment. For example, the controller 102 may connect to a smart thermostat to receive temperature data for various rooms throughout the house. The temperature data may be correlated with the dryness data to improve predicted drying rates and/or estimated drying times for various locations within the home.

In another embodiment, the drying system 100 may communicate with a home network IoT stack. The drying system 100 may perform an improved localization to accurately pinpoint the drying rack's position in various locations throughout the home. In some embodiments, the drying rack 122 may include location sensors that can be used to determine the angle of the drying rack in a respective environment. For example, the system 100 may be able to determine, through location data, that the drying rack 122 may be adjusted to a specific angle on a balcony (e.g. determined through image analysis from an IoT camera) to be subjected to more sun light to improve drying rates. The angle position and location of the drying rack 122 within the home can be fed into the machine learning module 110 to update the garment tracking profiles with more accurate prediction models.

FIG. 1 is intended to depict the representative major components of the drying system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the drying system 100 may not be present, and the arrangement of components may vary.

For example, while FIG. 1 illustrates an example drying system 100 having a single controller 102, one smart garment 120, one drying rack 122, one user device 124, and one IoT device 130, suitable network architectures for implementing embodiments of this disclosure may include any number of controllers, smart garments, drying racks, user devices, and IoT devices. The various models, modules, systems, and components illustrated in FIG. 1 may exist, if at all, across a plurality of controllers, smart garments, drying racks, user devices, and IoT devices.

Figure 2:
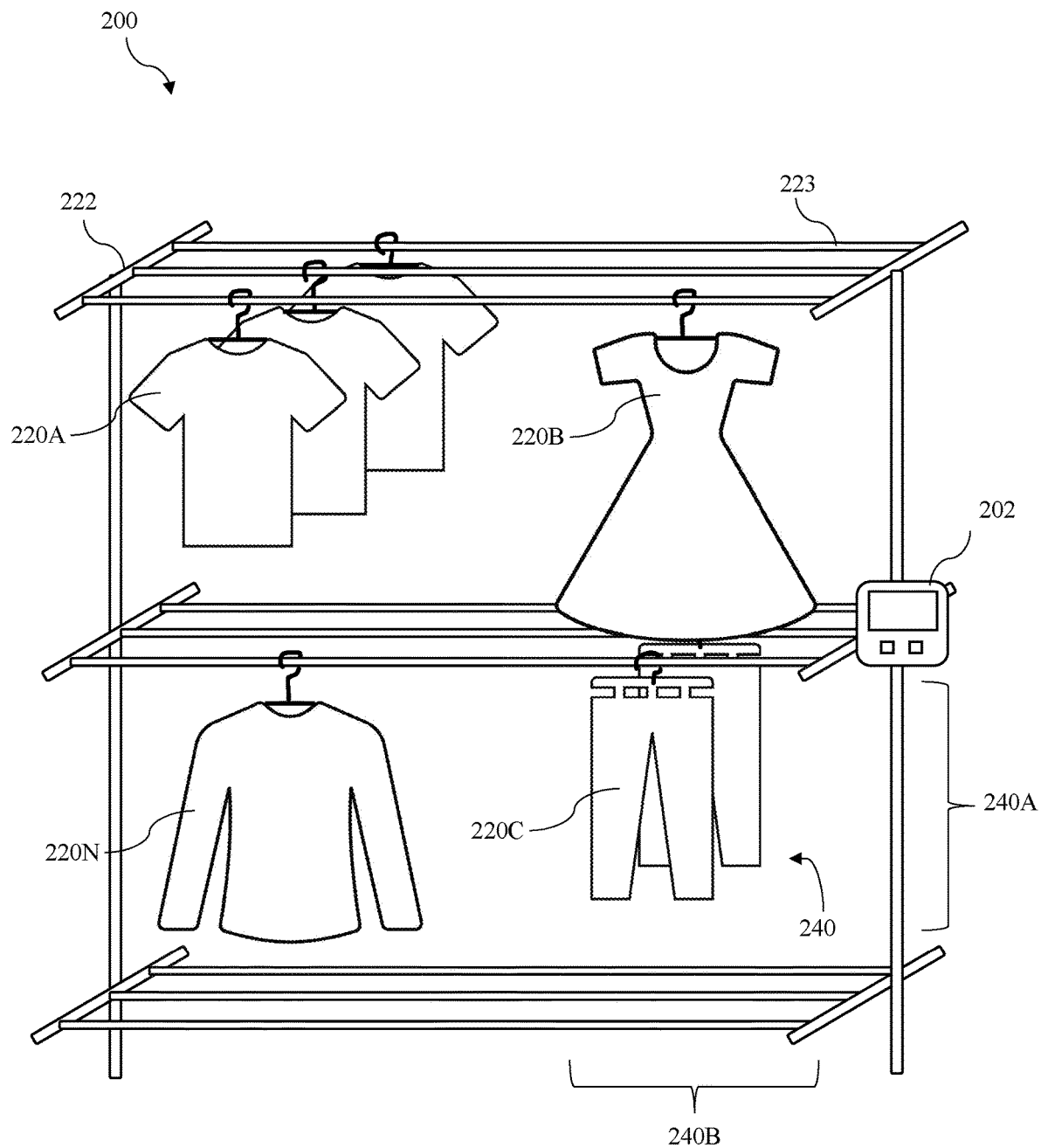
FIG. 2 illustrates a perspective view of an example drying system, in accordance with embodiments of the present disclosure.

Referring now to FIG. 2, shown is a perspective view of an example drying system 200, in accordance with embodiments of the present disclosure. The illustrated embodiment of system 200 is only used as an example and is not meant to be limiting. Size, shape, and dimensions may vary.

In the illustrated embodiment, the system includes a drying rack 222 having a plurality of drying members 223. The drying members 223 are configured to receive one or more smart garments 220A, 220B, 220C, and 220N (collectively referred to as smart garment(s) 220). Each smart garment 220 includes one or more location sensors that are communicatively coupled to controller 202 when brought within proximity of the controller. The placement/location of each smart garment 220 may be registered on a virtual map of the drying rack on the UI of the controller 202.

Once each smart garment 220 is registered on the drying rack 222, the controller 202 will begin to monitor the dryness level of each smart garment 220. In embodiments, the dryness data is received via one or more moisture sensors disposed on the smart garment 220. The controller 202 will determine the smart garment 220 is dry when the dryness data meets a dryness level threshold. Once the dryness level threshold is met, the controller 202 will notify a user by sending a notification to a user device (not shown) indicating the smart garment is dry.

In embodiments, the system 200 may group various smart garments 220 according to various attributes. For example, the user may want to be notified when all cotton t-shirts (e.g., smart garments 220A) are dry. The system 200 will monitor the dryness level of the grouped smart garments 220A as a whole and only notify the user when all smart garments 220A in the group have reached predetermined dryness level.

In embodiments, the grouped smart garments 220A may be classified as higher priority garments based on user preference. The controller may continuously monitor which zones are drying the garments on the drying rack fastest. For example, if the controller 202 determines that zone 240 (right side 240B of the bottom rack 240A) is drying the smart garments 220C at the fastest drying rate, the controller 202 may recommend to the user to re-position the grouped smart garments 220A to zone 240 because they are high priority garments. Various positional zones on the drying rack 222 may be affected by external factors of the environment which may cause differing drying rates. For example, zone 240 may be closer to an air vent within a home that increases the zone's drying rate.

Figure 3:
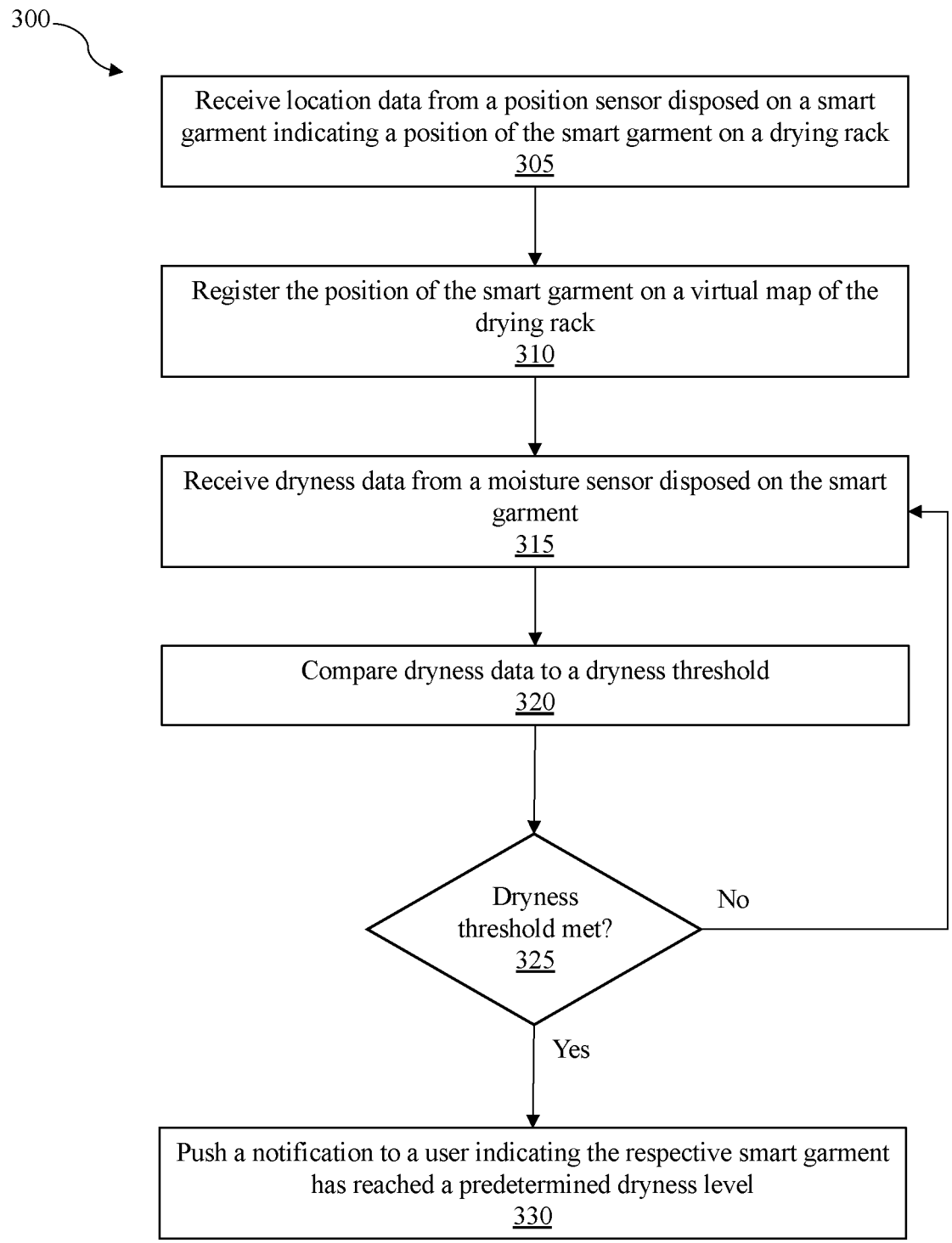
FIG. 3 illustrates a flow diagram of an example process for determining a dryness level of a garment, in accordance with embodiments of the present disclosure.

Referring now to FIG. 3, shown is a flow diagram of an example process 300 for determining a dryness level of a garment, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 104 exemplified in FIG. 1.

The process 300 begins by receiving location data from a position sensor disposed on one or more smart garments. This is illustrated at step 305. The location data received from the position senor indicates the one or more smart garments has been placed at a position on the drying rack. For example, a controller will determine that a smart garment has been placed on an upper right member of a drying rack from the location data received from the position sensor. In embodiments, the smart garment may be recognized by attempting to join the network (e.g., 5G or short-range network) associated with the controller.

Once the location data has been received, the process 300 continues by registering the position of the one or more smart garments on a virtual map displayed on a user interface (UI) of the controller. This is illustrated at step 310. The one or more smart garments are registered and/or recognized through the associated position sensor that the controller identifies. In embodiments, the garment may be automatically registered if the garment exceeds a predetermined time threshold. For example, the controller will only register a smart garment at a specific location on the drying rack if it has been located at the position longer than a certain time (e.g., 30 seconds). In this way, the controller will only register garments once they have been set in place preventing incorrect location determinations for the garments. In embodiments, the user may manually register the location of the garment on the controller.

In embodiments, the controller may determine the one or more smart garments have been removed from the drying rack based on availability of the position sensor data. If the controller determines the smart garment has been removed, the controller may automatically deregister the smart garment from the drying rack. In embodiments, this may be done based on a time threshold. If the controller does not receive location data from the smart garment within a certain time period, the smart garment will be deregistered. In embodiments, the user may also deregister the garments.

Once the one or more garments have been registered on the controller, the process 300 continues by receiving dryness data from a moisture sensor disposed on the one or more smart garments. This is illustrated at step 315. The controller will begin to monitor the dryness level (e.g., moisture, humidity, etc.) of each smart garment registered on the drying rack. Registering the smart garment communicatively couples the garment to the controller allowing the controller to receive the dryness data.

The process 300 continues by comparing the dryness data to a dryness threshold. This is illustrated at step 320. The dryness threshold may be a predetermined threshold for indicating the one or more smart garments has reached a preferred dryness level. If the dryness threshold has not been met, "No" at step 325, the process 300 will continue by monitoring the dryness data received from the moisture sensors. This is illustrated by returning to step 315. For example, a user may provide a specific dryness score that correlates to the moisture level of the one or more smart garments. For example, a user may predefine the dryness level based on the specific garment type (e.g., pants vs. shirts), or material.

If the dryness threshold has been met, "Yes" at step 325, the process continues by pushing a notification to a user. This is illustrated at step 330. The notification is used to inform the user that the respective smart garment has reached the desired dryness level. The notification may be any type of notification. For example, the controller may push a text notification to the user's smartphone or other mobile device.

In embodiments, the controller may send the user a notification indicating the one or more smart garments are nearing the predetermined dryness level. The notification may include an estimated drying time necessary to reach the desired dryness level. In embodiments, the estimated drying time can be approximated by interpolation of time taken to dry using the dryness levels of the different sensors at different times throughout the drying session or previous drying sessions. Once the notification is received the by the user, the user may remove the smart garments from the drying rack. Removal of the one or more smart garments will deregister the garment from the controller and dryness data will no longer be received for the respective smart garment.

Figure 4:
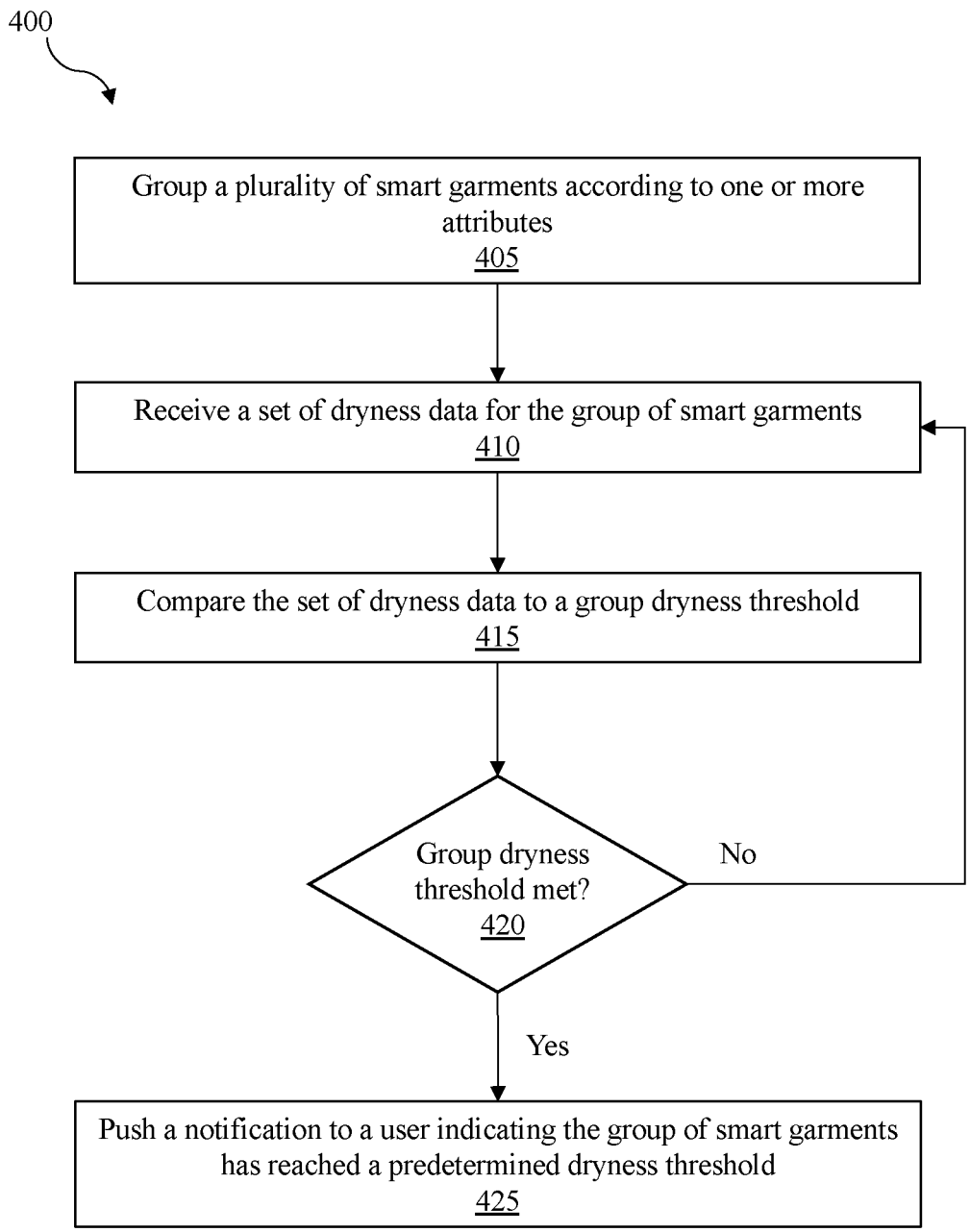
FIG. 4 illustrates a flow diagram of an example process for determining a dryness level of a group of smart garments, in accordance with embodiments of the present disclosure.

Referring now to FIG. 4, shown is a flow diagram of an example process 400 for determining a dryness level of a group of smart garments, in accordance with embodiments of the present disclosure. Process 400 may be in addition to or a subset of process 300. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by processor 104 exemplified in FIG. 1.

The process 400 begins by grouping a plurality of smart garments according to one or more attributes. This is illustrated at step 405. The grouping of smart garments may be manually chosen by the user or determined based off of garment tracking profiles. For example, the user may want to be notified when all of their dress pants are determined to be dry. The user may group these garments manually using the UI or the system may determine automatically based on historical user data and/or garment tracking profile data that the user always groups their pants together for notification purposes.

The process 400 continues by receiving a set of dryness data for the plurality of smart garments. This is illustrated at step 410. The process 400 continues by comparing the set of dryness data for the plurality of smart garments to a group dryness threshold. This is illustrated at step 415. Because the smart garments have been grouped together, the controller monitors the dryness data for the entire group. If one smart garment of the group has not met the dryness threshold, "No" at step 420, the controller will continue to monitor the set of dryness data for the group. This is illustrated by returning to step 410.

Once all of the smart garments in the group have met the dryness threshold, "Yes" at step 420, the system will push a notification to the user. This is illustrated at step 425. In this way, the user will be notified when the entire group of specified garments are dry. For example, a user may only be concerned with a specific outfit consisting of multiple smart garments (e.g., pants, shirt, blazer, etc.). This outfit may be grouped on the controller so the user will be notified when the entire outfit is dry, thus preventing the user from having to continually check on the dryness of each item of the outfit.

Figure 5:
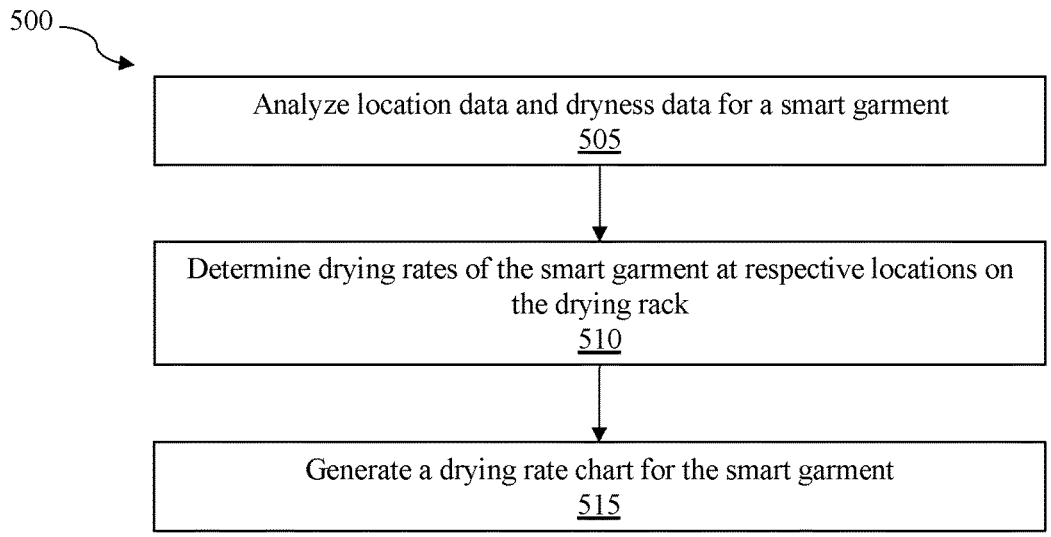
FIG. 5 illustrates a flow diagram of an example process for generating a drying rate chart for one or more smart garments, in accordance with embodiments of the present disclosure.

Referring now to FIG. 5, shown is a flow diagram of an example process 500 for generating a drying rate chart for one or more smart garments, in accordance with embodiments of the present disclosure. Process 500 may be in addition to or a subset of process 300. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 104 exemplified in FIG. 1.

The process 500 begins by analyzing, using machine learning, the location data and the dryness data received from one or more smart garments. This is illustrated at step 505. The analyzing may be performed by machine learning module 110 in FIG. 1. The location data and dryness data may be current data and/or historical data stored in a garment tracking profile for each smart garment on a database. The dryness and location data may be generated from the current drying sessions or taken from one or more previous drying sessions of the smart garment and/or similar smart garments.

The process 500 continues by determining drying rates of the one or more smart garments at respective locations on the drying rack. This is illustrated at step 510. In embodiments, the drying rate is determined over a period of time at specific zones (e.g., positional pockets) on the drying rack for each smart garment. A clustering and/or mean time computation is carried to determine the rate of drying of each smart garment at each location. The rates may be further weighted up or down depending on the smart garment's attributes (e.g., fabric, size, thickness, etc.)

The process 500 continues by generating drying rate chart for each of the one or more smart garments. This is illustrated at step 515. In embodiments, the drying rate chart may be any type of chart (e.g., graph, histogram, tracking chart) that indicates a relative position (e.g., zone) on the drying rack that produces an increased drying rate for each respective smart garment and/or group of garments. For example, historical dryness data may indicate that sweaters dry the quickest when placed on the right side of the drying rack member. Using the drying rate charts, the system may recommend zones for placement of smart garments depending on the priority of the respective garments. In this way, prioritized garments may be positioned in the zones determined to dry the respective garment the fastest. In embodiments, the drying rate charts may be stored for each respective smart garment within the garment tracking profile and used to improve predictions of estimated drying times.

Figure 6:
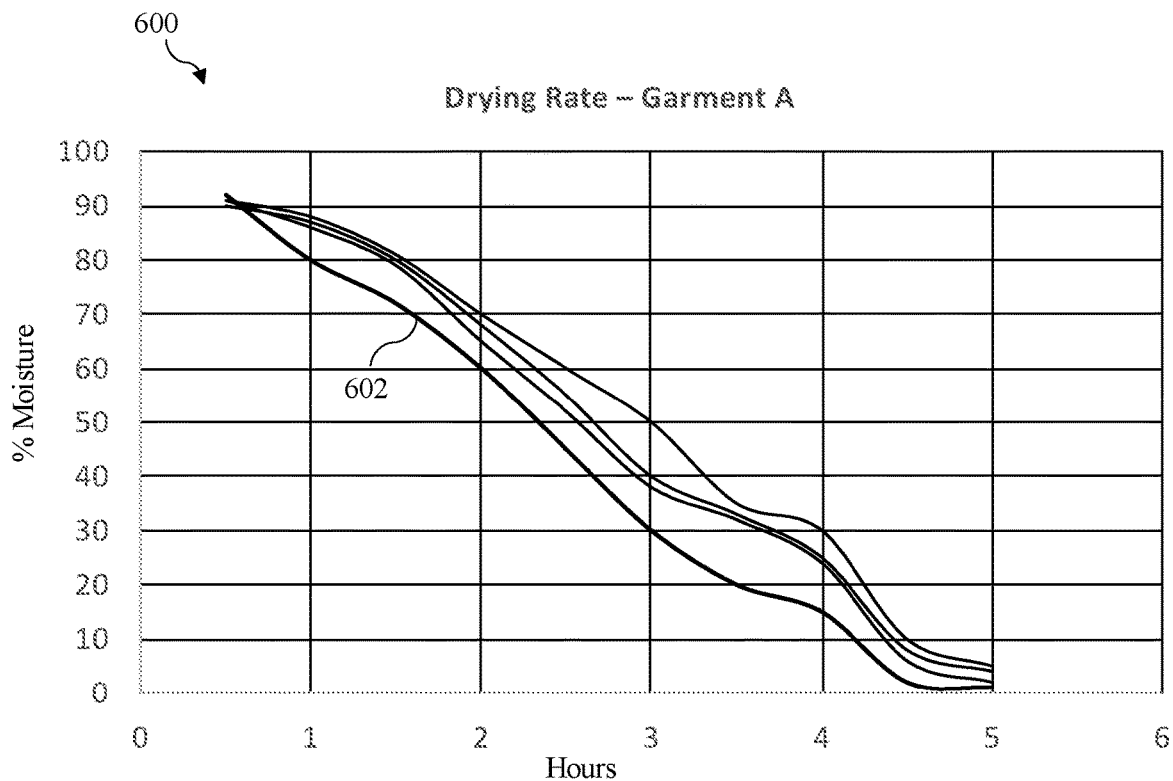
FIG. 6 illustrates an example drying rate chart, in accordance with embodiments of the present disclosure.

Referring now to FIG. 6, shown is an example drying rate chart 600, in accordance with embodiments of the present disclosure. In the illustrated embodiment, the drying rate chart 600 shows four different drying rates for four dryness zones (e.g., each line on the graph representing a different zone of the drying rack) for garment A. The x-axis indicates the time in hours while the y-axis indicates the % moisture level of garment A. On the drying rate chart 600, zone 602 is shown to be the fastest drying zone for garment A when compared to the other zones. For example, garment A reaches the 15% moisture level faster in zone 602 than the other three zones. The controller may utilize this data to determine which zone will dry a garment quickest. If garment A is determined to be a high priority garment (e.g., chosen by the user and/or based of garment profile data) the controller may notify the user to move the garment to the fastest drying zone located on the rack based off of the drying rate chart 600.

In embodiments, the drying rate chart 600 may be based on historical data for the respective garment. For example, the controller may store historical data for each garment in a garment database where various drying rates of the garment for each zone are determined. In embodiments, the dryness rate chart 600 may be based on data extrapolated from other smart garments having similar attributes (e.g., fabric type, fabric thickness, garment style, etc.). In embodiments, the drying rate chart 600 may be periodically updated with new dryness data.

Figure 7:
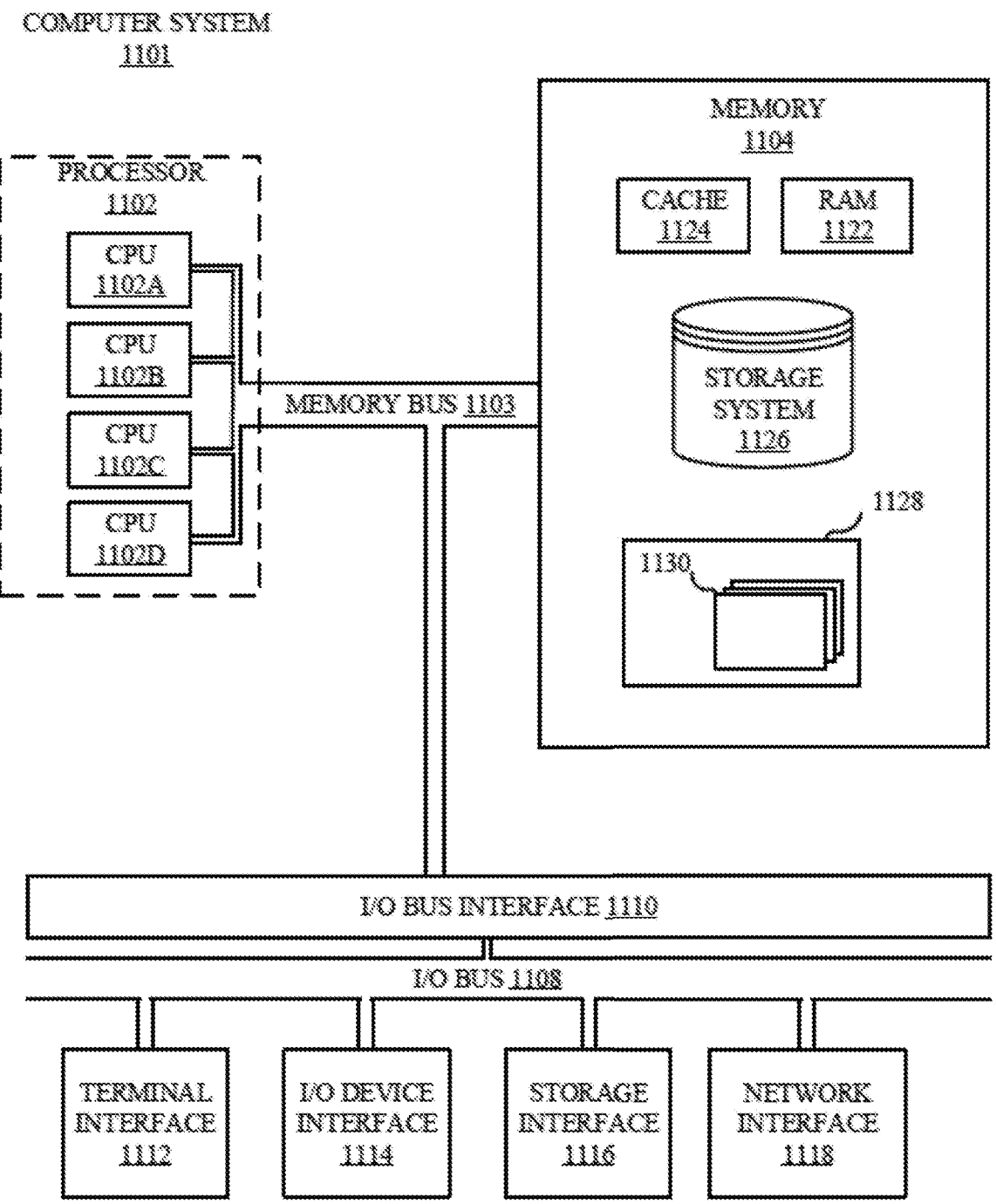
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300, 400, and 500).

System memory 1104 may include computer system readable media in the form of volatile memory, such as random access memory (RAM) 1122 or cache memory 1124.

Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 6 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
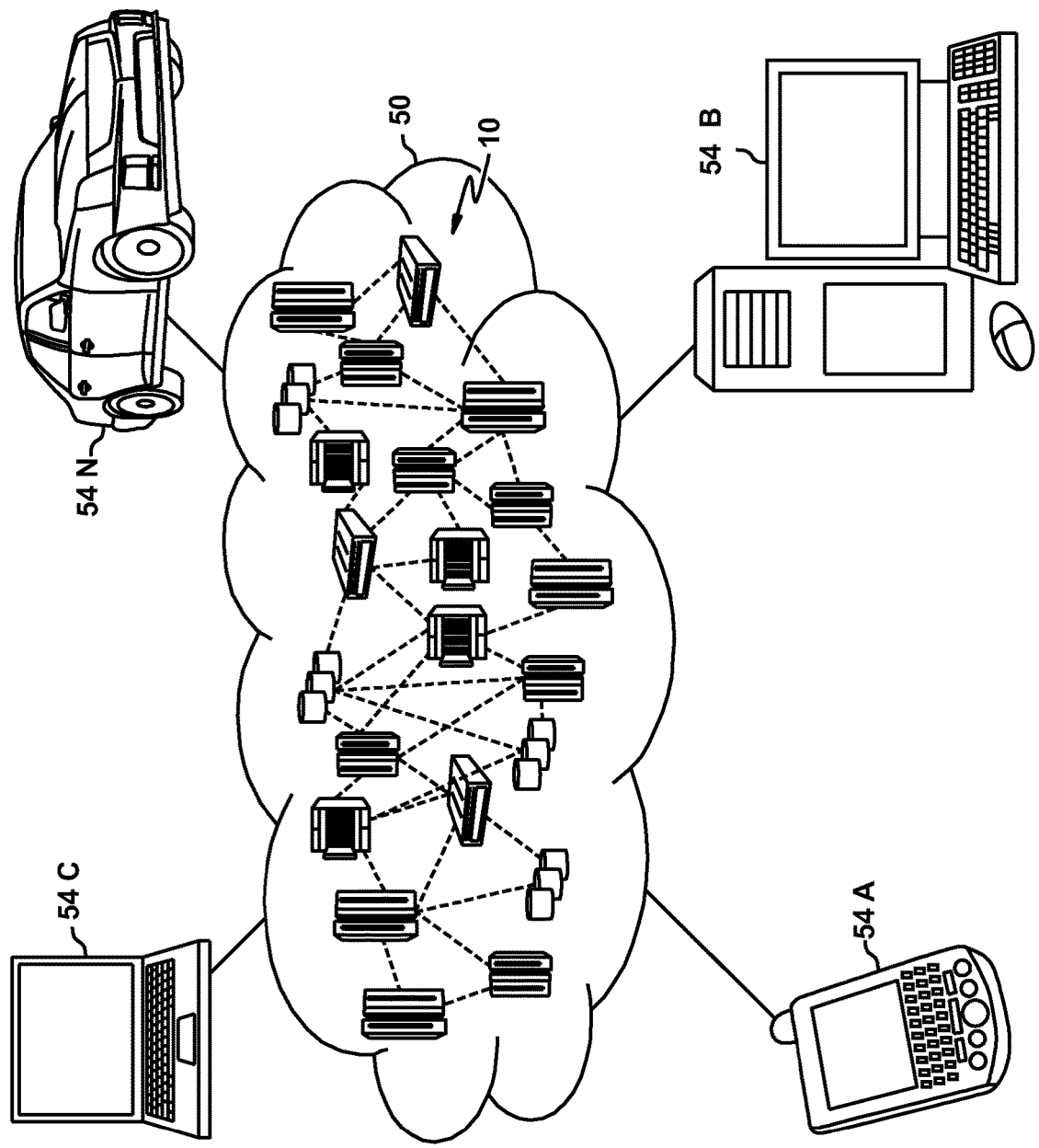
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
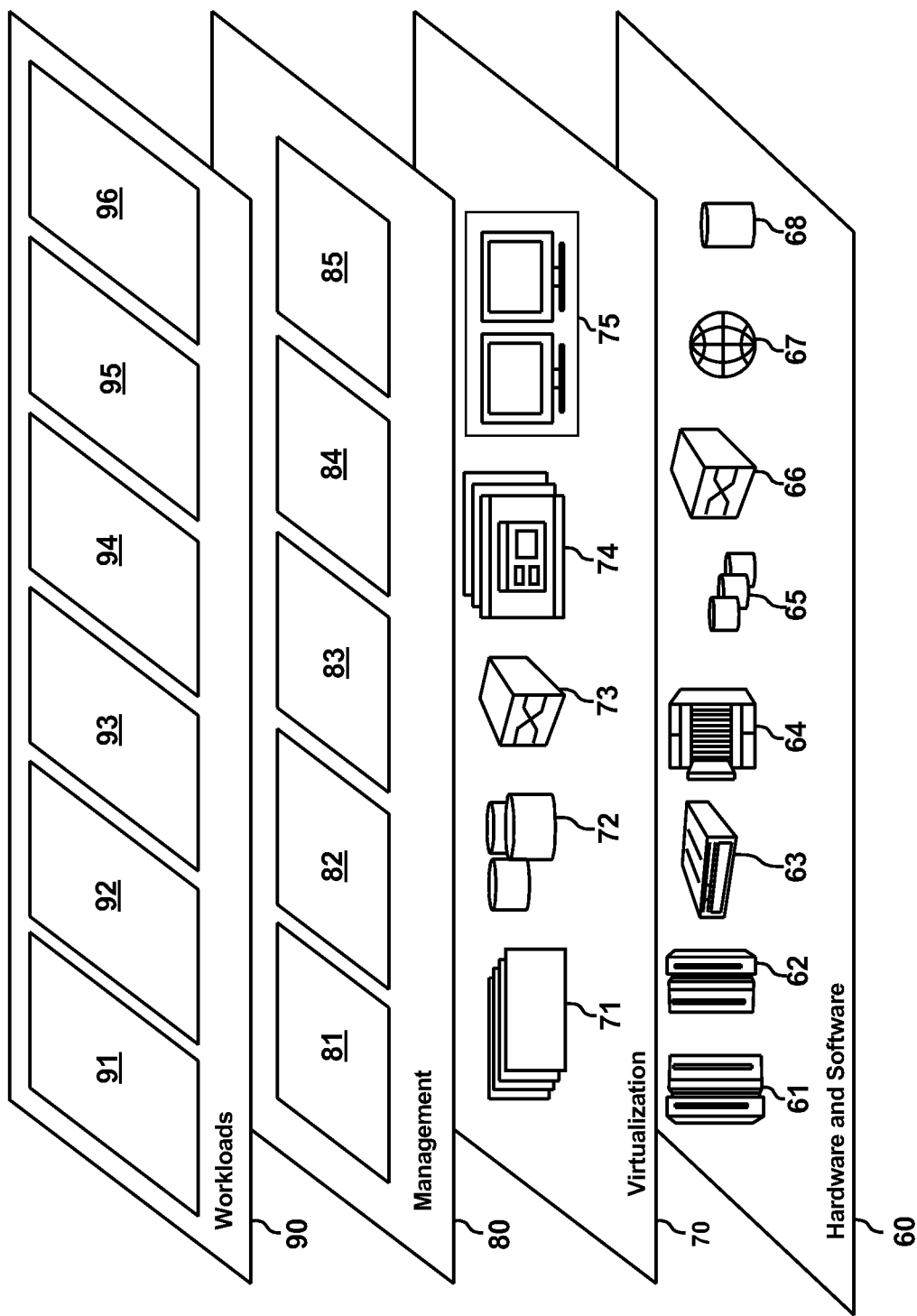
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A drying system, comprising:
 a drying rack having a plurality of drying members, wherein each drying member is configured to receive one or more garments;
 a controller, wherein the controller includes a processor; and
 a computer-readable storage medium communicatively coupled to the processor and storing program instructions which, when executed by the processor, cause the processor to perform a method comprising:
  receiving location data from a position sensor, wherein the location data indicates a position of the one or more garments on the drying rack;
  registering the location of the one or more garments on a virtual map of the drying rack displayed on a user interface of the controller;
  receiving dryness data for the one or more garments from a moisture sensor;
  comparing the dryness data to a dryness threshold; and
  pushing, in response to the dryness data meeting the dryness threshold, a notification to a user, wherein the method further comprises analyzing the location data and the dryness data; determining a drying rate for the one or more garments at respective locations on the drying rack; and generating a tracking profile for each of the one or more garments, wherein the tracking profile indicates a position on the drying rack that produces a fastest drying rate for each respective garment.

2. The drying system of claim 1, where the one or more garments are smart garments, and wherein the position sensor and the moisture sensor are embedded on the one or more smart garments.

3. The drying system of claim 2, wherein the method performed by the processor further comprises:
 grouping a plurality of smart garments according to one or more attributes;
 receiving a set of dryness data for the plurality of smart garments;
 comparing the set of dryness data for the plurality of smart garments to a group dryness threshold; and
 pushing, in response to the group dryness threshold being met, a notification to the user.

4. The drying system of claim 2, wherein the analyzing comprises:
 analyzing, using machine learning, the location data and the dryness data.

5. The drying system of claim 4, wherein the method performed by the processor further comprises:
 pushing a notification to the user recommending placement of the one or more smart garments at the position on the drying rack that produces the fastest drying rate.

6. The drying system of claim 4, wherein the method performed by the processor further comprises:
 receiving data from one or more internet of things (IOT) devices disposed within an environment;
 analyzing the data to determine a location of the drying rack relative to the environment; and
 updating the tracking profile for the one or more smart garments to include the location of the drying rack when determining the drying rate.

7. The drying system of claim 1, wherein the moisture sensor is disposed on a drying member, and wherein the moisture sensor is configured to detect the dryness data of a garment placed on the drying rack.

8. The drying system of claim 1, where the one or more garments are smart garments, wherein pushing the notification to the user comprises:
 displaying a text message on a user device indicating a predetermined dryness level has been met for the one or more smart garments.

9. The drying system of claim 1, where the one or more garments are smart garments, wherein the method performed by the processor further comprises:
 determining the one or more smart garments have been removed from the drying rack; and
 deregistering the one or more smart garment from the virtual map of the drying rack.

10. The drying system of claim 1, wherein the analyzing comprises:
 analyzing the location data and the dryness data over time.

11. The drying system of claim 1, wherein the receiving dryness data for the one or more garments from a moisture sensor, includes receiving dryness data for a first garment from a moisture sensor at a location of the first garment, and receiving dryness data for a second garment from a moisture sensor at a location of the second garment, wherein the determining includes determining a drying rate for the first garment, and for the second garment at respective locations of the first garment and the second garment on the drying rack.

12. The drying system of claim 1, wherein the receiving dryness data for the one or more garments from a moisture sensor, includes receiving dryness data for a first garment from a moisture sensor at a location of the first garment, and receiving dryness data for a second garment from a moisture sensor at a location of the second garment.

13. A computer implemented method comprising:
 receiving location data from a position sensor, wherein the location data indicates a position of one or more garments on a drying rack;

registering the location of the one or more garments on a virtual map of the drying rack displayed on a user interface of a controller;

receiving dryness data for the one or more garments from a moisture sensor;

comparing the dryness data to a dryness threshold; and pushing, in response to the dryness data meeting the dryness threshold, a notification to a user, wherein the method further comprises analyzing the location data and the dryness data; determining a drying rate for the one or more garments at respective locations on the drying rack; and generating a tracking profile for each of the one or more garments, wherein the tracking profile indicates a position on the drying rack that produces a fastest drying rate for each respective garment.

14. The computer implemented method of claim 13, wherein the analyzing comprises:

analyzing the location data and the dryness data over time.

15. The computer implemented method of claim 13, where the one or more garments are smart garments, and wherein the position sensor and the moisture sensor are embedded on the one or more smart garments.

16. The computer implemented method of claim 13, the method further comprising:

grouping a plurality of smart garments according to one or more attributes;

receiving a set of dryness data for the plurality of smart garments;

comparing the set of dryness data for the plurality of smart garments to a group dryness threshold; and pushing, in response to the group dryness threshold being met, a notification to the user.

17. The computer implemented method of claim 13, the analyzing further comprising:

analyzing, using machine learning, the location data and the dryness data.

18. The computer implemented method of claim 17, where the one or more garments are smart garments, further comprising:

receiving data from one or more internet of things (IOT) devices disposed within an environment;

analyzing the data to determine a location of the drying rack relative to the environment; and updating the tracking profile for the one or more smart garments to include the location of the drying rack when determining the drying rate.

19. A computer program product comprising a computer-readable storage medium having program instructions embodied therewith, wherein the computer-readable storage medium is not a transitory signal per se, the program instructions executable by a processor to cause the processor to perform a method comprising:

receiving location data from a position sensor, wherein the location data indicates a position of one or more garments on a drying rack;

registering the location of the one or more garments on a virtual map of the drying rack displayed on a user interface of a controller;

receiving dryness data for the one or more garments from a moisture sensor;

comparing the dryness data to a dryness threshold; and pushing, in response to the dryness data meeting the dryness threshold, a notification to a user, wherein the method further comprises analyzing the location data and the dryness data; determining a drying rate for the one or more garments at respective locations on the drying rack; and generating a tracking profile for each of the one or more garments, wherein the tracking profile indicates a position on the drying rack that produces a fastest drying rate for each respective garment.

20. The computer program product of claim 19, wherein the analyzing comprises:

analyzing the location data and the dryness data over time.

* * * * *